(12) United States Patent
Lynch

(10) Patent No.: US 9,116,011 B2
(45) Date of Patent: Aug. 25, 2015

(54) THREE DIMENSIONAL ROUTING

(75) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 87 days.

(21) Appl. No.: 13/278,546

(22) Filed: Oct. 21, 2011

(65) Prior Publication Data

US 2013/0103303 A1    Apr. 25, 2013

(51) Int. Cl.
*G01C 21/00*    (2006.01)
*G01C 21/36*    (2006.01)
*G06T 15/20*    (2011.01)
*G06T 17/05*    (2011.01)

(52) U.S. Cl.
CPC .......... *G01C 21/3638* (2013.01); *G06T 15/205* (2013.01); *G06T 17/05* (2013.01)

(58) Field of Classification Search
CPC .. G06F 19/345; G06K 9/0071; A61B 3/0058; A61B 3/10; A61B 5/16
USPC ......... 701/400, 410, 431, 436, 438, 523, 537; 345/48, 419, 428; 382/154
See application file for complete search history.

(56) References Cited

U.S. PATENT DOCUMENTS

| | | |
|---|---|---|
| 6,374,182 B2 | 4/2002 | Bechtolsheim et al. |
| 6,417,850 B1 | 7/2002 | Kang |
| 6,507,665 B1 | 1/2003 | Cahill et al. |
| 6,552,744 B2 | 4/2003 | Chen |
| 6,999,620 B1 | 2/2006 | Harville |
| 7,003,136 B1 | 2/2006 | Harville |
| 7,460,953 B2 | 12/2008 | Herbst et al. |
| 7,626,596 B2 | 12/2009 | Kotake et al. |

| | | |
|---|---|---|
| 2004/0169724 A1 | 9/2004 | Ekpar |
| 2005/0280661 A1 | 12/2005 | Kobayashi et al. |
| 2006/0002590 A1 | 1/2006 | Borak |
| 2006/0072848 A1 | 4/2006 | Razzano |

(Continued)

FOREIGN PATENT DOCUMENTS

| | | |
|---|---|---|
| EP | 1584897 A2 | 10/2005 |
| EP | 2 309 463 | 4/2011 |

(Continued)

OTHER PUBLICATIONS

International Search Report and Written Opinion cited in PCT/EP2012/069812 mailed on Mar. 6, 2013.

(Continued)

*Primary Examiner* — Redhwan k Mawari
*Assistant Examiner* — Rodney P King
(74) *Attorney, Agent, or Firm* — Lempia Summerfield Katz LLC

(57) ABSTRACT

One or more systems, devices, and/or methods for three dimensional routing are disclosed. For example, one embodiment includes receiving image data selected based on a viewer perspective from a memory. The image data is correlated with a depthmap generated from an optical distancing system and correlated with route data calculated from an origin point to a destination point using a geographical database and a routing algorithm. The controller compares a first distance, from the viewer perspective to a point correlated with the route data, to a second distance, derived from the depth map at the point. If the comparison indicates that the first distance is closer to the viewer perspective than the second distance, the controller inserts at least one pixel of a navigation illustration into the image data. The image data including the navigation illustration is transmitted to or stored in a memory.

20 Claims, 10 Drawing Sheets

(56) References Cited

U.S. PATENT DOCUMENTS

| | | | |
|---|---|---|---|
| 2006/0184320 A1* | 8/2006 | Hong | 701/209 |
| 2007/0076920 A1 | 4/2007 | Ofek | |
| 2007/0233380 A1* | 10/2007 | Tanaka | 701/211 |
| 2007/0237424 A1 | 10/2007 | Burg et al. | |
| 2009/0027418 A1 | 1/2009 | Maru et al. | |
| 2009/0195536 A1 | 8/2009 | Louise et al. | |
| 2009/0292457 A1 | 11/2009 | Ford et al. | |
| 2010/0023250 A1 | 1/2010 | Mays et al. | |
| 2010/0299065 A1 | 11/2010 | Mays | |
| 2010/0305854 A1 | 12/2010 | Kammel et al. | |
| 2011/0098918 A1* | 4/2011 | Siliski et al. | 701/201 |
| 2011/0109617 A1 | 5/2011 | Snook et al. | |
| 2011/0109618 A1* | 5/2011 | Nowak et al. | 345/419 |
| 2011/0141141 A1 | 6/2011 | Kankainen | |
| 2011/0216935 A1* | 9/2011 | Mays et al. | 382/100 |
| 2011/0246055 A1* | 10/2011 | Huck et al. | 701/201 |
| 2011/0279452 A1 | 11/2011 | Ibe et al. | |
| 2011/0283223 A1 | 11/2011 | Vaittinen et al. | |
| 2011/0289510 A1 | 11/2011 | Lin et al. | |
| 2011/0310091 A2 | 12/2011 | Yoshida et al. | |
| 2011/0313653 A1 | 12/2011 | Lindner | |
| 2012/0044476 A1 | 2/2012 | Earhart et al. | |
| 2012/0051631 A1 | 3/2012 | Nguyen et al. | |
| 2012/0114225 A1 | 5/2012 | Lim et al. | |
| 2012/0133639 A1 | 5/2012 | Kopf et al. | |
| 2013/0038689 A1* | 2/2013 | McDowall | 348/45 |

FOREIGN PATENT DOCUMENTS

| | | |
|---|---|---|
| WO | WO2009131276 A1 | 10/2009 |
| WO | WO 2010/012310 | 2/2010 |
| WO | WO2010024212 | 3/2010 |

OTHER PUBLICATIONS

Kawakita et al., "Real-Time Three-Dimensional Video Image Composition by Depth Information", IEICE Electronics Press, vol. 1, No. 9, Aug. 10, 2004.
International Search Report and Written Opinion from PCT/EP2012/074881, Apr. 8, 2013.
"Google Maps Navigation for mobile." http://www.g000le.com<mobile/navigation/. 2 pages (viewed on Oct. 19, 2011).
U.S. Appl. No. 13/278,499, filed Oct. 21, 2011, Lynch, unpublished.
U.S. Appl. No. 13/278,512, filed Oct. 21, 2011, Lynch, unpublished.
Ding, Ming et al., :Automatic registration of aerial imagery with untextured 3D LiDAR models, University of California Berkeley, 8 pages.
Inpainting, http://iat.ubalt.edu/summers/math/inpainting.htm (viewed on Nov. 30, 2011).
Kopf, Johannes et al., "Street Slide: Browsing Street Level Imagery," Microsoft Research, 8 pages.
U.S. Appl. No. 13/332,718, filed Dec. 21, 2011, Lynch, unpublished.
U.S. Appl. No. 13/340,923, filed Dec. 30, 2011, Lynch, unpublished.
U.S. Appl. No. 13/341,152, filed Dec. 30, 2011, Lynch, unpublished.
David Gallup et al., "Piecewise Planar and Non-planar Stereo for Urban Scene Reconstruction", Jun. 13, 2010, pp. 1418-1425, 2010 IEEE Conference on Computer Vision and Pattern Recognition.
International Search Report and Written Opinion, from related International Application No. PCT/EP2012/070438, Apr. 17, 2013.
International Search Report and Written Opinion, from related International Application No. PCT/EP2012/075022, Apr. 15, 2013.
Stephen Shankland, "Google Gathers 3D Data with Street View", May 15, 2008, retreived from the internet: URL: http://news.cnet.com/8301-10784_3-9945.
Anderson et al., Unwrapping and Visualizing Cuneiform Tablets, 2002, p. 82-88, vol. 22, Issue 6, IEEE Computer Graphics and Applications.
Frueh et al., Data Processing Algorithms for Generating Textured 3D Building Facade Meshes from Laser Scans and Camera Images, 2005, p. 159-184, vol. 61, International Journal of Computer Vision.
Hu et al., Integrating LiDAR, Aerial Image and Ground Images for Complete Urban Building Modeling, 2006, p. 184-191, 3D Data Processing, Visualization and Transmission.
Song et al., Assessing the Possibility of Land-Cover Classification using LiDAR Intensity Data, 2002, p. 259-262, International Archives of Photogrammetry.
Wei, Building Boundary Extraction Based on LiDAR Point Clouds Data, 2008, pp. 157-162, 37, Part B3b, International Archives of Phtotgrammetry Remote Sensing and Spatial Information Sciences.
Yu et al., Automated Derivation of Urban Building Density Information using Airborne LiDAR Data and Object-Based Method, 2010, p. 210-219, Elsevier, Landscape and Urban Planning 98.

* cited by examiner

THREE DIMENSIONAL ROUTING

REFERENCE TO RELATED APPLICATIONS

The present patent application is related to the copending patent applications filed on the same date, Ser. No. 13/278,499, entitled "REIMAGING BASED ON DEPTHMAP INFORMATION," and Ser. No. 13/278,512, entitled "DEPTH CURSOR AND DEPTH MEASUREMENT IN IMAGES," the entire disclosures of which are incorporated by reference herein.

BACKGROUND OF THE INVENTION

The present invention relates to maps and/or navigation and, more particularly, to method(s) and system(s) for illustrating routes in images, such as panoramic, street level view, or high-altitude view images, using depth information.

Navigation applications may be installed in vehicles to provide images to passengers or in portable (e.g., handheld) devices such as phones, personal digital assistants, or personal navigation devices. The navigation application may provide images that aid the user in determining current position and guiding the user to a destination. In addition the images provide information such as points of interest to the user. Navigation applications may provide turn by turn directions in a list or a route drawn on a map. However, challenges in providing navigation information still exist. Accordingly, improvements and unique ways to provide and display map and/or navigation information/features are desired.

SUMMARY OF THE INVENTION

According to one aspect, one or more systems, devices, and/or methods for three dimensional routing are disclosed. For example, one embodiment includes receiving image data selected based on a viewer perspective from a memory. The image data is correlated with a depthmap generated from an optical distancing system and correlated with route data calculated from an origin point to a destination point using a geographical database and a routing algorithm. The controller compares a first distance, from the viewer perspective to a point correlated with the route data, to a second distance, derived from the depth map at the point. If the comparison indicates that the first distance is closer to the viewer perspective than the second distance, the controller inserts at least one pixel of a navigation illustration into the image data. The image data including the navigation illustration is transmitted to or stored in a memory.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1A:
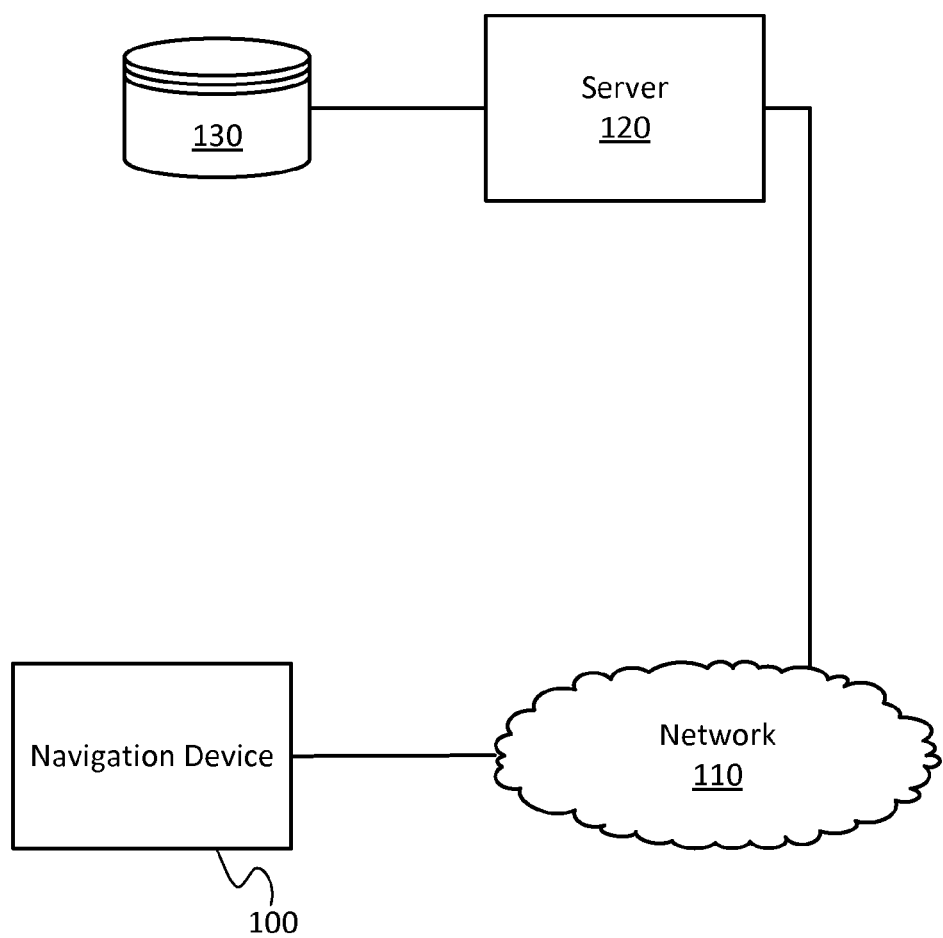
FIG. 1A illustrates an example embodiment of a navigation system or map system.

Map systems or navigation systems provide users with panoramic images, street level view images, or high-altitude images (e.g., satellite, airplane) for navigation related features or map related features for pedestrians. Navigation related features include determining an optimum route and providing directions (e.g., cues or turns) to travel along a path from an original location to a destination location. The path may be a road network, a pedestrian pathway network, or an indoor walkway network. Navigation related features may be provided by mobile devices or stationary devices.

Navigation related features may involve a computer generated route illustration in images. The route illustration, which may also be referred to as a navigation illustration, is a visual cue to the user regarding the path from the original location to the destination location that is drawn in the images. The images are photographs, collected images, or any images not entirely generated by machine. These images may be referred to as panoramic images or street level images. The route illustration may be a route icon drawn in the image on the depiction of the sidewalk, walkway, crosswalk, or other path component in the images. The route illustration may be an icon such as a geometric shape, a person, or other indicator. The route illustration may move in the direction of travel or include an indicator of the direction of movement along the path.

The route illustration may also be drawn to emphasize the differences in depth between real world objects in the image. The route illustration may be drawn in the image to appear in front of one or more objects in the image and/or behind one or more objects in the image. The route illustration may be a line from one point in the image to another point in the image drawn behind or in front of the real world objects in the image. The size of the route illustration may be scaled such that the route illustration appears smaller in the background of the image and larger in the foreground of the image. The route illustration is drawn in the image by correlating the image with a depthmap (depth map).

Depthmaps may be constructed from light detection and ranging (LIDAR) data. LIDAR, which may also be referred to as three-dimensional laser scanning or an optical distancing system, employs one or more lasers or "cameras" to collect data points representing an area, such as an area about a road or walkway. Software generates the depthmap based on the measured distance, the locations of the optical distancing system, which may be on a moving platform such as a car, and the angle of the laser. Other optical distancing systems include a stereoscopic camera, a time of flight infrared camera, and a structured light device.

A LIDAR device collects and gathers data points in a point cloud in which each data point corresponds to a local coordinate, such as (x, y, z). Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

FIG. 1A illustrates a system 150 for three dimensional pedestrian routing. The system 150 includes a user device 100 (e.g., map device, navigation device), a network 110, a server 120, and a geographic database 130. The geographic database 130 may be maintained by a map developer, such as NAVTEQ North America, LLC located in Chicago, Ill. The map developer may collect geographic data to generate and enhance the geographic database 130. The user device 100 may be a cellular telephone (smart phone), a personal digital assistant ("PDA"), a tablet computer, a laptop, a personal navigation device ("PND"), an in-vehicle navigation system, a personal computer or another computing device.

The system 150 receives a depthmap generated from an optical distancing system. The depthmap includes depth data for each of a plurality of points. The optical distancing system may be a LIDAR device, a stereoscopic camera, or a structured light device. The depthmap is generated from the collected optical distance data. The depthmap may be created using any arbitrary viewpoint or perspective. The optical distance data is 3D data is easily manipulated to any viewpoint or perspective, which is in contrast to a 2D image which is valid from a fixed viewpoint. Depthmaps may be generated for each image viewpoint and stored in the database 130. The depthmap includes position data (X-Y coordinates) and depth data (Z coordinate) for each of plurality of points. The depth information provides each pixel with a 3D location that correlated with the stored image geo-position and orientation provides the real-world position of each pixel as a 3D value.

The system 150 calculates or receives route data for a route from an origin point to a destination point. The route data may be calculated using the geographical database 130 and any routing algorithm. Traditional node-link (or segment) map structures and/or open area map structures may be used. Routing algorithms include but are not limited to the Dijkstra method, an A-star (or A*) algorithm or search, and/or other route exploration or calculation algorithms. Various aspects (such as distance, costs, and/or restrictions) of the route are considered to determine an optimum route. The route data includes a series of points locations in a spatial coordinate system.

Figure 1B:
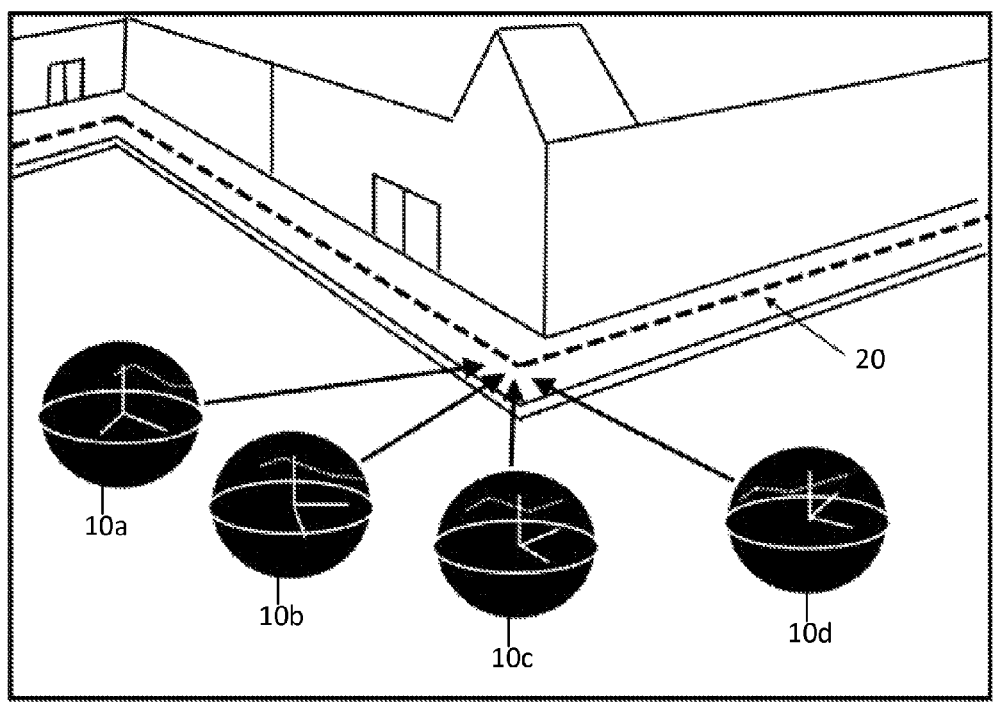
FIG. 1B illustrates a street level image.

FIG. 1B illustrates a street level image for three dimensional routing. For example, an image or panoramic image may be pixilated raster data in a bitmap, JPEG, GIF, and/or other image format. The route 20 traverses a potential pedestrian path. Each point along route 20 is referenced to the spatial coordinate system. FIG. 1B further illustrates an image bubble at a plurality of poses 10a-d. The route 20 is projected onto any panoramic image of the image bubble. From any pose, the route 20 referenced to the spatial coordinate system aligns with the pixels that make up the sidewalk. In other words, the system 150 may automatically draw the route 20 into the panoramic images at the correct location relative to the image.

In addition, the system 150 may display the correct scaling of the route 20. The precise pose of the image may be used to determine the 3D perspective and direction of the objects captured in the image. With this pose information, the 3D path may be drawn with the same perspective and orientation such that the path now looks like it is part of the panoramic image. The calculation may involve the distance between the viewer perspective at the center of the image bubble and the point of the route 20 in the spatial coordinate system. Alternatively, the calculation may include a 4×4 view and projection matrix to transform the 3D path in screen coordinates. The specific view and projection matrices are computed from the image pose and user settings (such as desired view direction and field of view). Therefore, the 3D route may be automatically integrated into each image without manually recreating the route for each of the panoramic images.

The image bubbles may be a sphere around a user device but could be modeled as any 3D shape. Each image bubble defines an image viewable in 360 degrees (or less) a portion at a time based on at least one angle (e.g., heading, vertical angle). Once the route has been associated with 3D locations and stored in the geographic database, the route is combined with the image bubble and does not need to be manually recreated for subsequent 2D images.

The system 150 for three dimensional routing also determines whether the route is in front of or behind objects in the 2D image. The objects in the image may include points of interest such as buildings, addresses, location names, store fronts, geographical features, signs, or any physical object. For example, the system 150 compares a first distance, from the viewer perspective to a point correlated with the route data, to a second distance, derived from the depth map at the point.

If the comparison indicates that the first distance is closer to the viewer perspective than the second distance, then the system 150 inserts at least one pixel of a navigation illustration into the image data. In one example, the image data is replaced with another color, brightness, hue, or intensity. As the comparison is repeated for several pixels, the system 150 effectively draws a navigation illustration into the image data. The navigation illustration may include a direction component and a navigation icon. The image data including the navigation illustration is stored in a memory, which may be included in server 120, the user device 100, or database 130.

The computing resources necessary for illustrating depth in an image may be divided between the server 120 and the user device 100. In some embodiments, the server 120 performs a majority of the processing ("server-based embodiments"). The database 130 stores the depthmap generated from an optical distancing system and stores the panoramic images, and the server 120 receives the depthmap and the panoramic images from the database 130. The server 120 correlates the depthmap with the image data. The server 120 calculates or receives three dimensional route data and correlates the route data with the image data. In other words, the image data is geo-located and geo-oriented, which allows the server 120 to calculate a distance from the viewer perspective to the route. The position of the route is compared to other objects in the image.

If the comparison indicates the route data is closer to the viewer perspective that objects in the panoramic image, the server 120 inserts at least one pixel of a navigation illustration into the image data. The navigation illustration may include data indicative of the destination of the route. At locations where objects in the panoramic image are closer to the viewer perspective, no change is made to the panoramic image data. Alternatively, the server 120 may draw a dotted line at these locations without removing any image data. The server 120 transmits the modified panoramic image including the navigation illustration to the user device 100.

In other embodiments, the user device 100 performs a majority of the processing ("user device-based embodiments"). The user device 100 receives a depthmap from the server 120. Alternatively, the user device 100 may receive the combined depthmap and image from the server 120. The image is displayed to a user. The user device 100 may allow the user to select an origin point and a destination point, from which the three dimensional route data are calculated.

The user device 100 utilizes the depthmap to determine the route visibility and when to draw the route into the image. For example, the user device 100 compares the distance from a perspective of the image of the object in the image to the distance to the route. If the comparison indicates the route data is closer to the viewer perspective, the user device 100 draws a navigation illustration. The navigation illustration may include an icon and/or an indication of direction. The navigation illustration may move along the route within the image.

For navigation related applications, the user device 100 may generate a location according to the geographic location of the user device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a or dead reckoning system based on a previously known position. The positioning circuitry may also determine an orientation using any of the above systems and/or a magnetic sensor such as a compass. The orientation and the location allow the appropriate depthmap and panoramic image to be selected based on the perspective of the user at the current geographic location of the user device 100.

The network 110 may include any combination of a cellular network, the Internet, or a local computer network. For example, the user device 100 may communicate with the network 110 wirelessly though protocols known as Wi-Fi, the protocols defined by the IEEE 802.11 standards, the protocols defined by the Bluetooth standards, or other protocols. Alternatively or in addition, the user device 100 may communicate with the network 110 wirelessly as a cellular network such as a Global System for Mobile Communication (GSM) or other third generation (3G) or fourth generation (4G) networks.

Figure 2A:
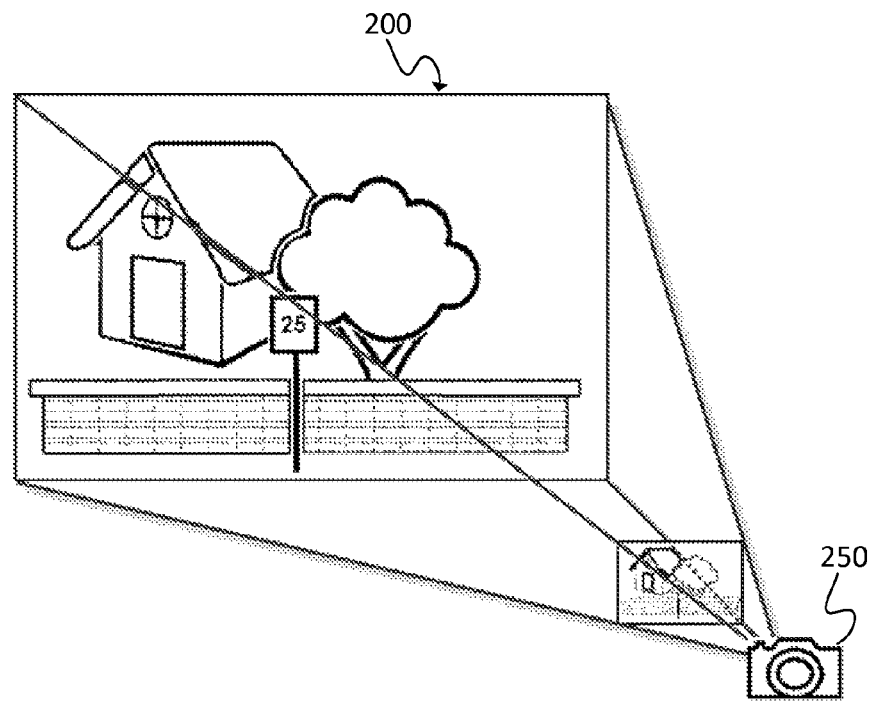
FIG. 2A illustrates a predetermined camera angle that the image was collected.

FIG. 2A illustrates an image 200 for use with system 150. The image 200 may depict outdoor environments, as shown, indoor environments (e.g., shopping mall, convention center, etc.) or hybrid outdoor and indoor environments (e.g., fairgrounds, amusement park, etc.). Alternatively, the image 200 may be displayed in an augmented reality system. In the augmented reality system, the image 200 is received in real time by a camera on the user device 100. The image 200 may be a panoramic image, a street level view image, or an elevated view image. The image 200 includes objects at a plurality of depths.

FIG. 2A also illustrates a predetermined camera angle that the image 200 was collected by a camera 250. The predetermined camera angle may have one, two, or three components (e.g., roll, pitch, yaw; heading and vertical angle) measured from any of three coordinate axes. The camera also records its specific positional location (e.g. geo-coordinates). The predetermined camera angle may be used to align the depth data to the panoramic image. The image 200 may be a planar image additionally defined by a field of view. Alternatively, the camera 250 may be an unknown position and/or orientation at the time the image 200 was collected. Feature matching may match features in the image 200 to known images in the database 130 in order to determine the position or orientation of the image. The camera 250 may be included in the user device 100.

Figure 2B:
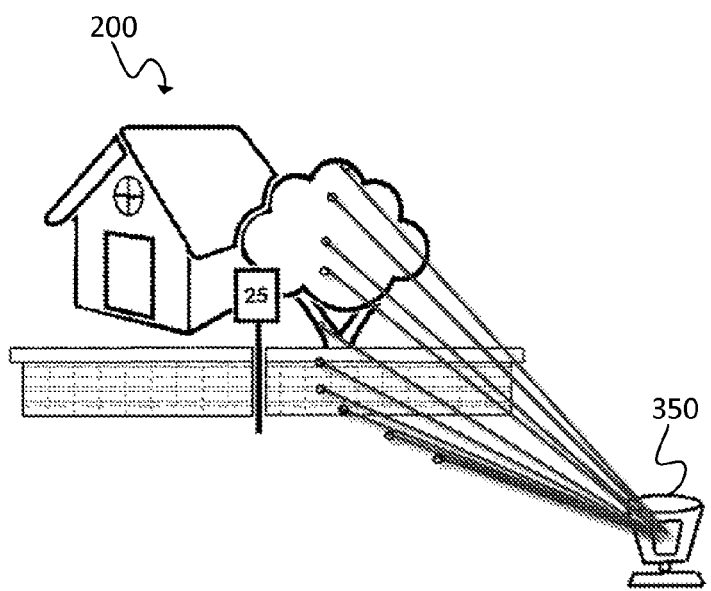
FIG. 2B illustrates the collection of optical distance data using the optical distancing system.

FIG. 2B illustrates the generation of optical distance data using the optical distancing system 350. The optical distancing system 350 may be a LIDAR device, a stereoscopic camera, a time of flight camera, a structured light device, or another device. In the example of a LIDAR device, one or more (e.g., 1, 2, 10) lasers rotate about an axis. The optical distancing system 350 may be coupled with an inertial measurement unit (IMU) and/or an inertial navigation system (INS) in order to provide a geographic reference to the optical distance data. The optical distancing system 350 may be coupled with an inertial measurement unit (IMU) to associate the optical distance data with the geo-located position of the optical distancing system 350. FIG. 2B illustrates one such plane including laser paths 301 and depth points 303. The optical distancing system 350 measures the distance from the optical distancing system 350 to the various objects. In another example, the structured light device emits light onto objects and a camera captures images the structured light to determine distance based on the shape of the light in the captured images. The structured light may be infrared light or another light spectrum not visible to humans.

The depthmap data is aligned with the perspective of camera 250. It should be noted that the optical distancing data may be received from any angle. However, at other angles, the optical distancing data may be manipulated to form depthmap data. The collected optical distance data may be true 3D data points. Because of the 3D nature of the points (as opposed to 2D image pixels), the data may be viewed from any angle. Therefore, a 'virtual' camera viewpoint of the 3D data may be simulated. In contrast, the camera capture of the image 200 is fixed based on the 2D image data, a camera view direction and a camera origin position or geo-location. For example, the virtual camera viewpoint is simulated by creating a view of the 3D data from the same viewpoint as that of the 2D color image by projecting the 3D points onto the camera viewplane. The distance of the 3D point from the camera is saved to generate a depthmap image such that each RGB color pixel of the original image has a direct mapping to a value in the depthmap that represents the distance of the pixel from the camera. The optical distance data, which may be referred to as 3D scan data, is correlated with the collected image (e.g., panoramic image, street level image).

Figure 3A:
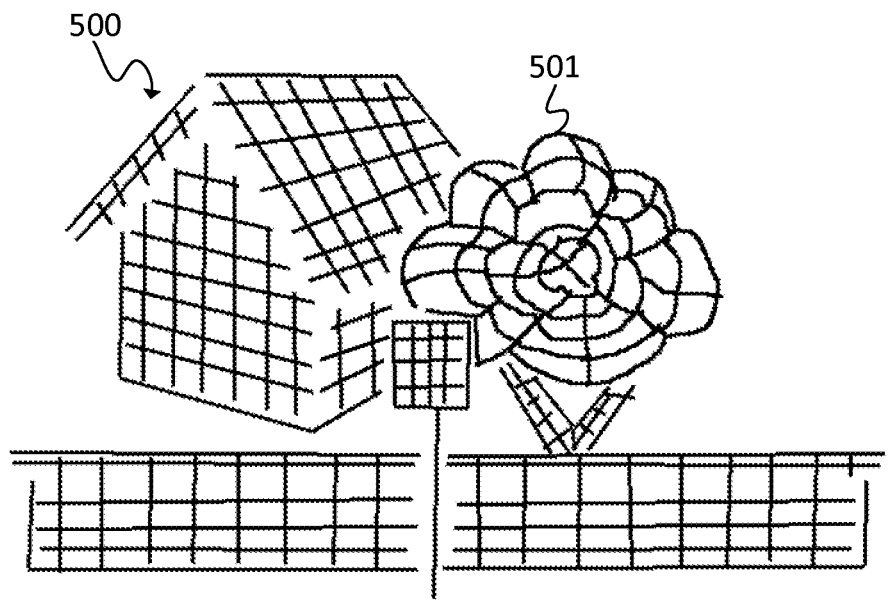
FIGS. 3A and 3B illustrate example depthmap grids
Figure 3B:
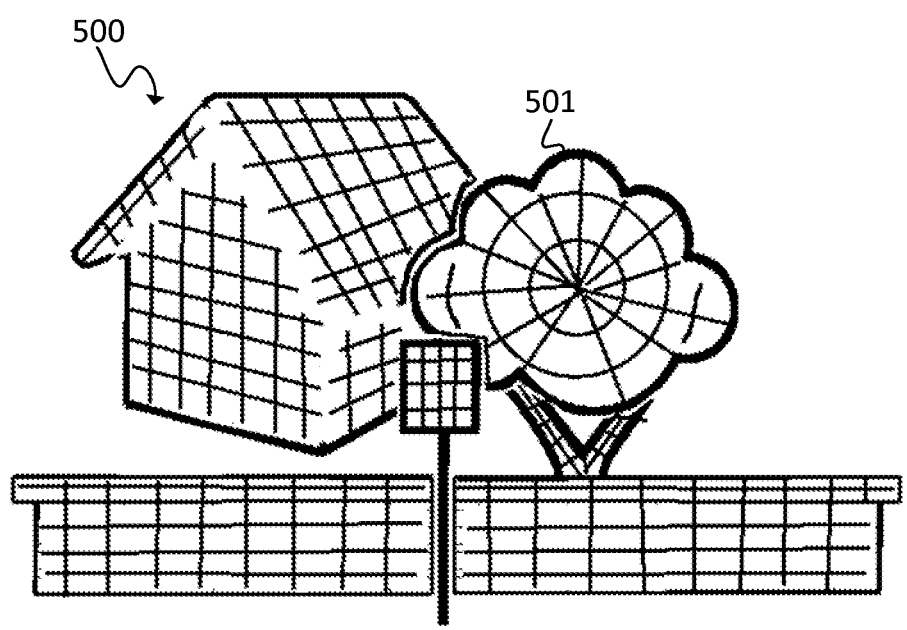

FIGS. 3A and 3B illustrate two example depthmap grids 500. Each cell 501 in the depthmap grid 500 spans multiple pixel locations. The depth data is displayed as a grid for demonstration purposes. However, each pixel may specify a unique depth value determined from the 3D sensor data points. Likewise, depth figures may be demonstrated by discrete depth values while in reality, these values may include a nearly continuous range of depth distances.

Generally, a depthmap is described as an image containing pixels that store depth values rather than RGB (red, green, blue) values. However, there are alternative mechanisms for storing and retrieving depth information. One mechanism for associating an image pixel with a depth value includes storing raw 3D points. An alternative mechanism includes pre-generating depth values for each image pixel and storing the depthmap as an image alongside the original color image. Another alternative mechanism includes converting the depthmap image pixels to a vector, polygon, or mesh based mapping to save memory space. The image may be converted to one of these vector/polygon/mesh representations by detecting approximate edges and gradients in the depth image. This storage model may be more efficient for storage and delivery due to smaller memory requirements. FIGS. 3A and 3B illustrate a mesh type depth map storage model.

Figure 4A:
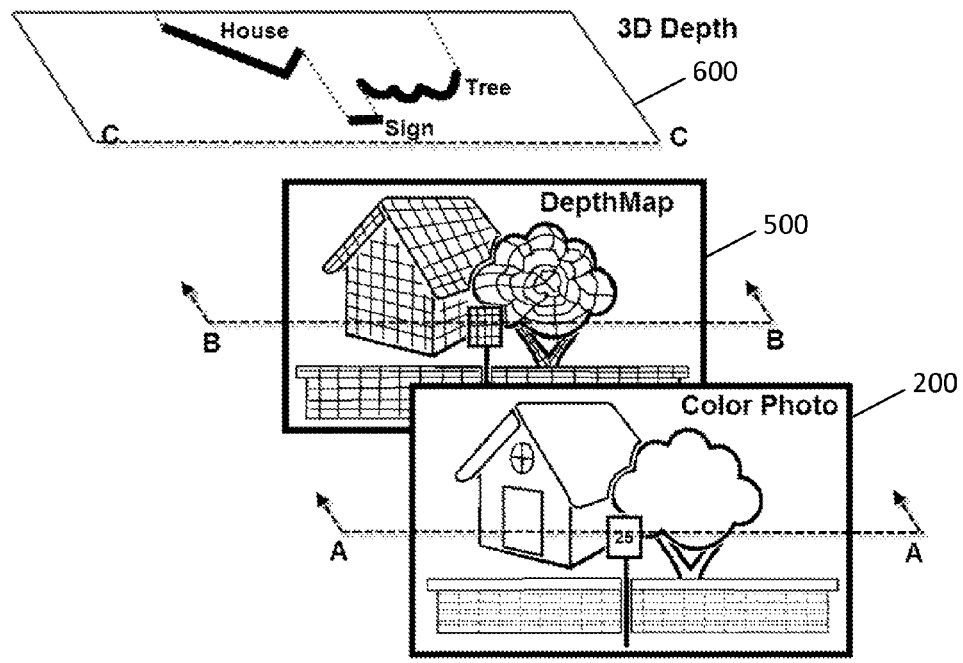
FIGS. 4A and 4B illustrate the determination of depth values.
Figure 4B:
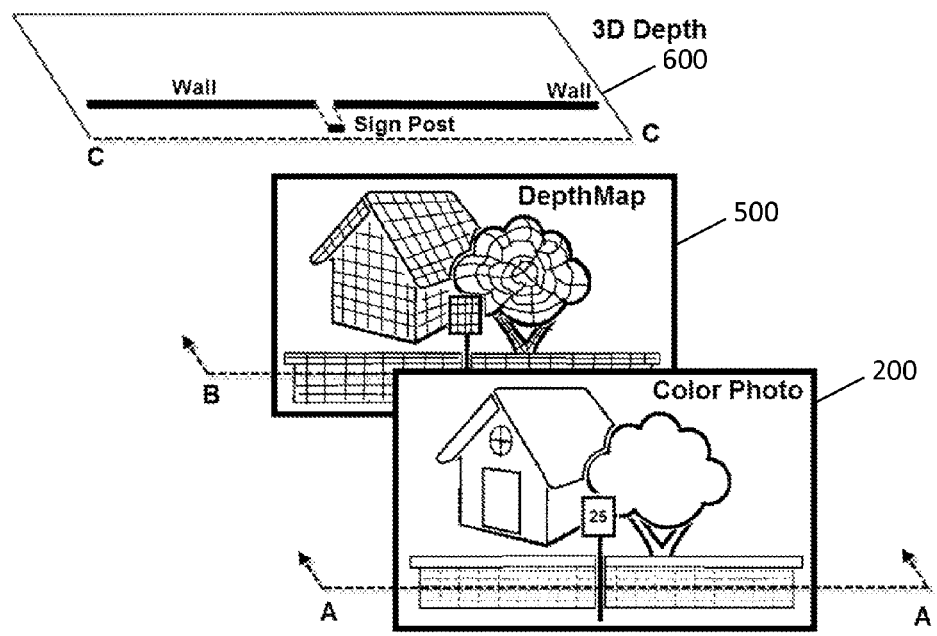

FIGS. 4A and 4B illustrate the calculation of image mapped depth values from a pre-generated depthmap. FIG. 4A illustrates a first cross section A-A of the image 200, which corresponds to a second cross section B-B in the depthmap grid 500. The C-C cross section plane or top down view 600 in FIG. 4A shows the depth values are defined to correspond to the sign 207, house 201, and tree 203. The depth map cross section C-C indicates that the house 201 is the furthest from the camera while the sign 207 is the closest. FIG. 4B illustrates a first cross section A-A of the image 200, which corresponds to a second cross section B-B in the depthmap grid 500. The C-C cross section plane or top down view 600 in FIG. 4B shows the depth values are defined to correspond to the sign 207 and the wall 205.

Figure 5A:
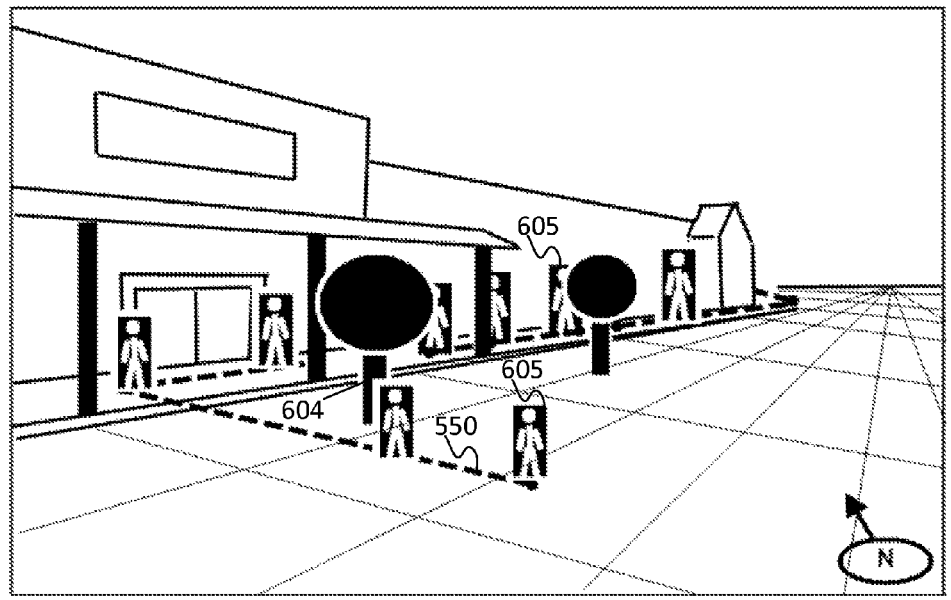
FIG. 5A illustrates a street level image for use with a navigation system or a map system of FIG. 1.
Figure 5B:
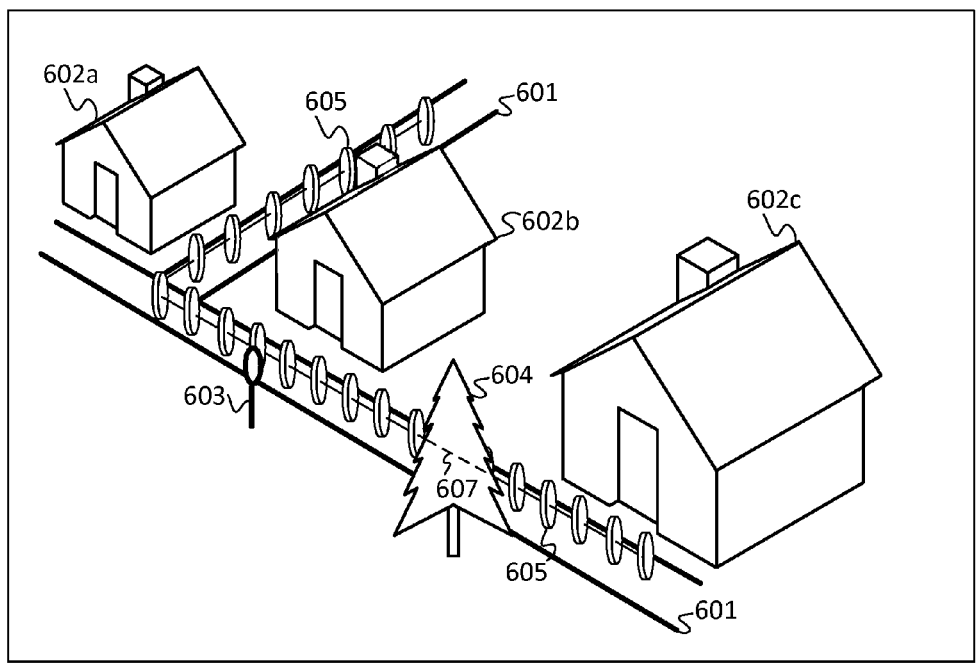
FIG. 5B illustrates an elevated image for use with a navigation system or a map system of FIG. 1.

FIG. 5A illustrates a street level image for use with the system 150 of FIG. 1. The image could be from any perspective including elevated view, street level, or any other view with depth. A street level view may be preferred by the user to most closely simulate the real world view has the user follows the route. The street level view image of FIG. 5A includes objects including trees 604, and a navigation illustration 605. The route 550 may be shown as part of the navigation illustration 605 or it may be omitted. The elevated view image of FIG. 5B illustrates an elevated view image for use with the system 150 of FIG. 1. The elevated view image of FIG. 5B includes several objects including a sidewalk 601, several buildings 602a-c, a sign 603, and a tree 604.

The views of FIG. 5A and Figure B include three dimensional routing. The image is combined with navigation illustration 605 to illustrate the route between the origin point and the destination point, which may be outside of the image. The navigation illustration 605 includes a navigation icon and/or a line. The navigation icon may move within the image along the route in the direction of travel. Rather than simply drawing the navigation illustration 605 on top of the image, the server 120 or user device 100 utilizes the depth map values to draw the navigation illustration 605 in front of or behind objects in the image. For example, the navigation illustration 605 appears behind a portion of building 602b and sign 603 and in front of sidewalk 601. In addition, the navigation illustration 605 may include a faded line or a dotted line 607, for example, which is shown as the navigation illustration 605 passes behind the tree 604.

The size of the navigation illustration 605 may also be scaled to show depth. For each point along the route in the image, the server 120 or the user device 100 determines how far into the image the navigation illustration 605 be drawn based on the associated depth map value. For example, the portions of the navigation illustration 605 in front of building 602c are drawn larger than the portion of the navigation illustration 605 behind the building 602b. Each navigation icon that makes up the navigation illustration 605 may be defined by a scale factor. The scale factor may be proportional to the depth value associated with that location in the image. In other words, the navigation illustration 605 may comprise a plurality of navigation icons at a plurality of sizes dependent on the depth of the route data in the panoramic image. An example scaling function may be inversely proportional to distance (e.g., $X_s = X_{ref}/D$, wherein $X_s$ is a scaled size, $X_{ref}$ is a reference size, and D is a distance). The scaling function may be performed by a perspective matrix (e.g., 4×4 matrix). In some implementations, large depth values correspond to farther in the background of the image, and in other implementations, large depth values correspond to closer in the foreground of the image.

Figure 6:
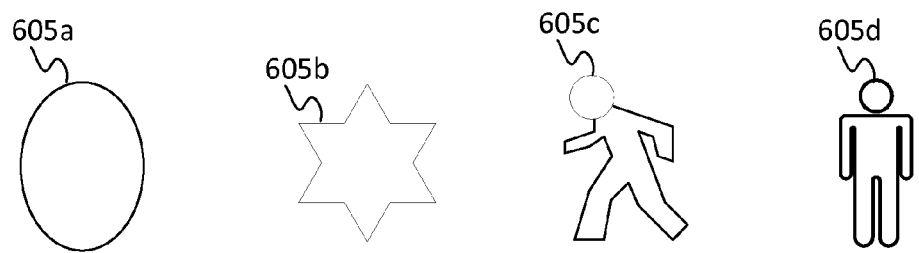
FIG. 6 illustrates various implementation of a navigation illustration.

FIG. 6 illustrates various implementations of navigation icons of the navigation illustration 605. The navigation icon may be any shape, such as a disc or oval navigation icon 605a or a star 605b. The navigation icon may simulate walking such as human shaped navigation icons 605c and 605d. The human shaped navigation icons 605c and 605d. Each portion of a route (e.g., a range of addresses, a city block, a street, a town) may be associated with a different icon or graphic.

Figure 7:
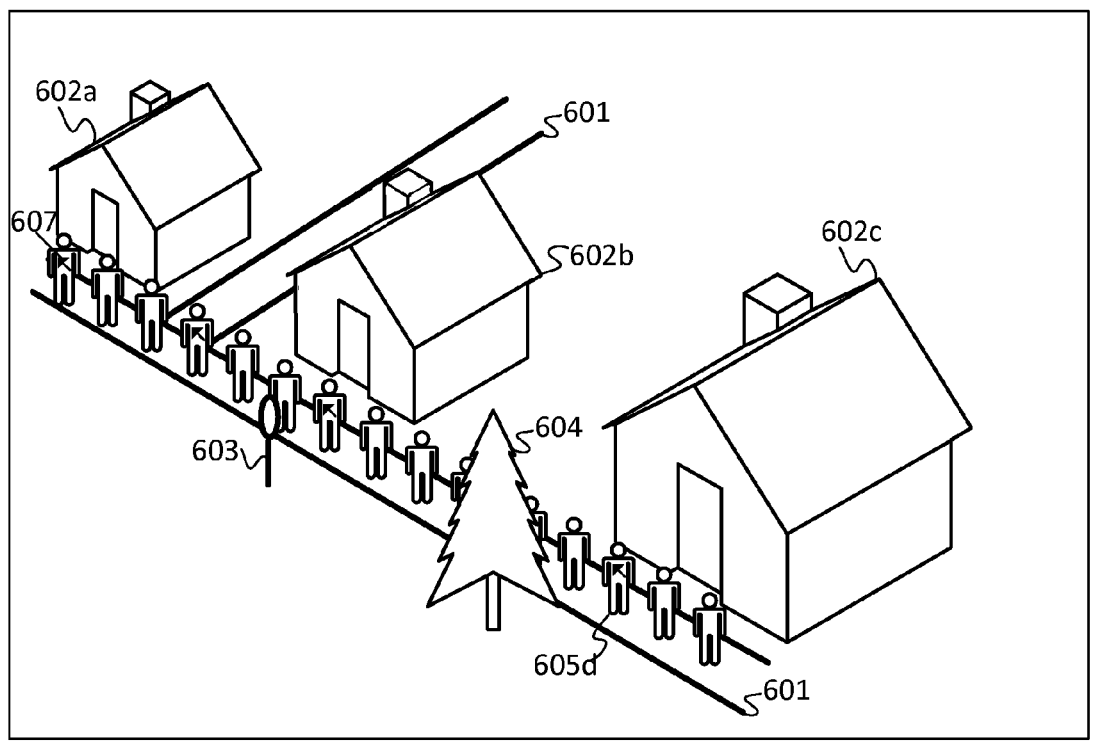
FIG. 7 illustrates another implementation of three dimensional routing.

FIG. 7 illustrates another implementation of three dimensional routing. The navigation illustration includes the human shaped navigation icon 605d. The navigation illustration includes an indication of the direction of the route. The indication of direction may be shown by a moving navigation illustration. For example, the navigation icons 605d may be continuously redrawn to show movement along the route. Alternatively, the indication of direction may be an arrow 607.

Figure 8:
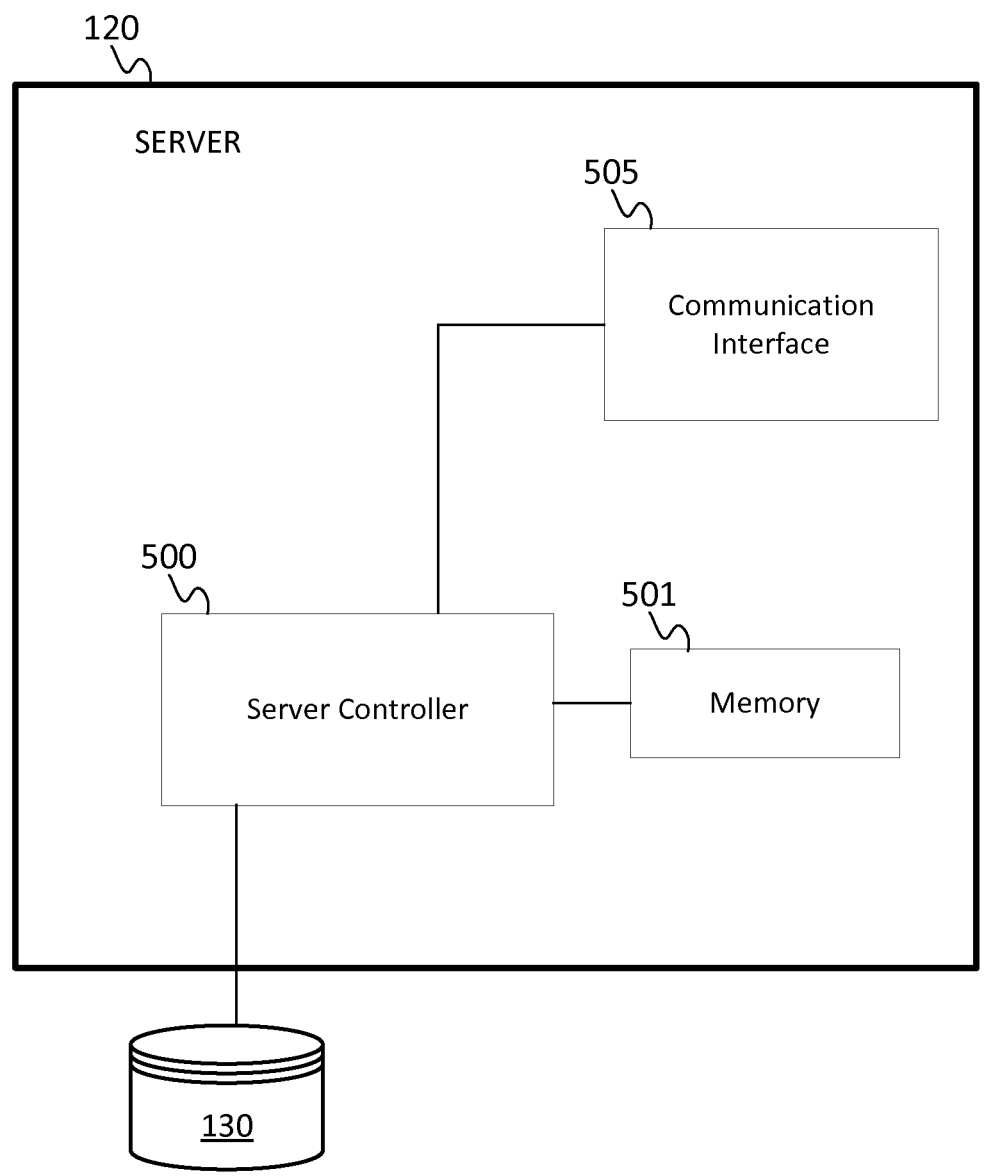
FIG. 8 illustrates a detailed view of the server of FIG. 1.
Figure 9:
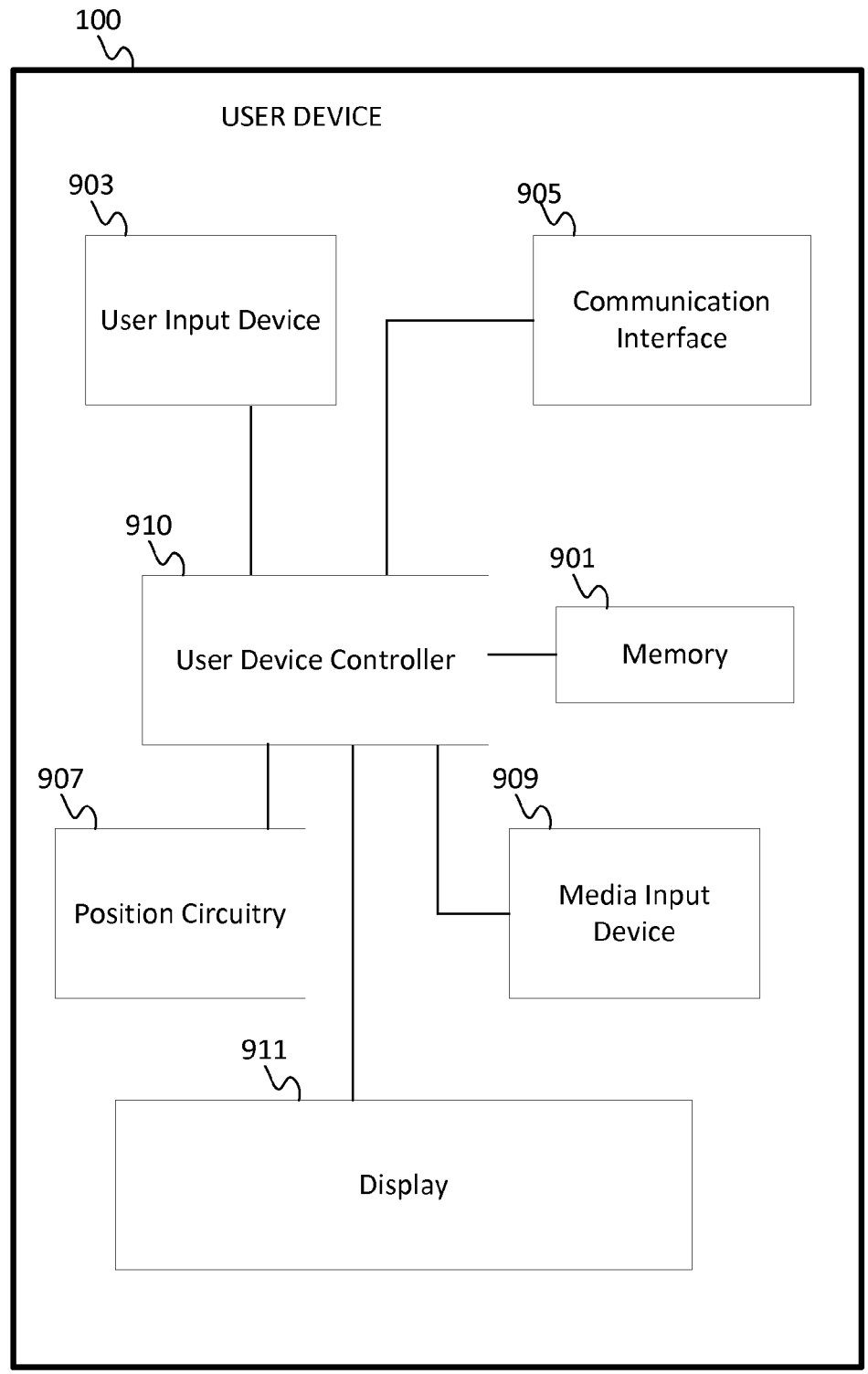
FIG. 9 illustrates a detailed view of the user device of FIG. 1.

FIG. 8 illustrates a detailed view of the server 120 of FIG. 1. The server 120 includes a server controller 500, a memory 501, and a communication interface 505. The database 130 may be external or internal to the server 120. In the server-based embodiments, the server 120 is an apparatus for providing three dimensional routing in a panoramic image. FIG. 9 illustrates a detailed view of user device 100 of FIG. 1. In the user device-based embodiments, the user device 100 is an apparatus for providing for three dimensional routing in a panoramic image. The user device 100 includes a user device controller 910, a memory 901, a communication interface 905, and position circuitry 907. The user device 100 may also include a user input device 903, a media input device 909, and a display 911.

In the server-based embodiments, the database 130 stores three dimensional geographic data correlated with route data calculated from an origin point to a destination point. The route data may be determined by any routing algorithm either by server controller 500 or externally. The route data may be derived from node-segment map data. The node-segment map data includes nodes, which represent intersections or intersection points, and links or path segments, which connect the nodes. The node-segment map data is stored in a geographic database (e.g., database 130) in a spatial format (e.g., Oracle spatial format), which is maintained by the map developer and compiled into a delivery format (e.g., geographical data file (GDF) format).

The routing algorithm may be based on a Dijkstra method, an A-star algorithm or search, and/or other route exploration or calculation algorithms. Various aspects, such as distance, non-navigable areas, costs, and/or restrictions, are considered to determine an optimum route. The routing algorithm may be specific to pedestrian routing. The routing algorithm may rank links or segments according to suitability for traversal by pedestrians. For example, links or segments may be classified according to a plurality of pedestrian modes, including walking, bicycle, and wheelchair. The routing algorithm may include interactive user editing or creating a path on top of the panoramic images using depthmaps for picking 3D locations. In this way, the user may create pedestrian routes in street level view or elevated view, rather than a typical top-down view.

The server controller 500 is configured to select a panoramic image according to a user input. The user input includes one or more of a specified position, a heading, and a vertical angle. The user input may be received at user device 100 or based on the detected location of the user device 100.

The server controller 500 identifies where the route data intersects the panoramic image. The three dimensional points of the route data are calculated from the routing algorithm.

The three dimensional points of the route data are correlated to the panoramic image using the image bubble from the specified position, heading, and/or vertical angle.

The server controller 500 determines where in the panoramic image the route should be drawn unimpeded and where objects in the panoramic image should block the route using depth values from the depth map. The server controller 500 identifies depth values in the depth map associated with points along the route. When a distance from the a viewer perspective to the route data indicates a closer distance than the depth value from the depth map, the server controller 500 inserts a navigation illustration 605 in the panoramic image. When the distance to the route data indicates a farther distance than the depth value from the depth map, the server controller 500 does not change the panoramic image, or changes the panoramic image to a lesser degree.

As discussed above, the apparatus for providing three dimensional routing in a panoramic image may operate with or without position data for the current location of the user device 100. When the position data is used in the server-based embodiments, the position circuitry 907 determines a current geographic position of the user device 100 and the communication interface 905 sends the current geographic position to the server 120. When the position data is used in the user-device based embodiments, the position circuitry 907 determines location data including the position and/or the orientation of the user device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a or dead reckoning system based on a previously known position. The orientation may be determined using any of the above systems and/or a magnetic sensor such as a compass or a three dimensional magnetic sensor array. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the user device 100. The location and/or orientation data may be used to select the depthmap 500 and the panoramic image 200 from the database 130.

In the user device-based embodiments, the memory 901 is configured to store the depthmap correlated with the panoramic image. The depthmap is generated from the optical distancing system 350 and includes depth data for each of the plurality of pixels. The user device controller 910 is configured to receive image data selected based on a viewer perspective of the panoramic image and correlate the image data with route data calculated from an origin point to a destination point.

The user device controller 910 calculates data indicative of a distance from the viewer perspective to a selected point correlated with the route data to determine a route depth (first distance). The user device controller 910 calculates a distance derived from the depth map at the selected point to determine an object depth (second distance). The user device controller 910 compares the route depth to the object depth, and if the comparison indicates that the first distance is closer to the viewer perspective than the second distance, then the user device controller 910 inserts at least one pixel of a navigation illustration into the image data. If the comparison indicates that the second distance is closer than the first distance (i.e., the location of an object in the panoramic image is closer to the viewer perspective), then the user device controller 910 inserts at least one pixel of a line representing the route data.

The user device controller 910 or server controller 500 may include a general processor, digital signal processor, an application specific integrated circuit (ASIC), field programmable gate array, analog circuit, digital circuit, combinations thereof, or other now known or later developed processor. The user device controller 910 or server controller 500 may be a single device or combinations of devices, such as associated with a network, distributed processing, or cloud computing.

The memories 501, 901 may be a volatile memory or a non-volatile memory. The memory 501, 901 may include one or more of a read only memory (ROM), random access memory (RAM), a flash memory, an electronic erasable program read only memory (EEPROM), or other type of memory. The memory 501, 901 may be removable from the user device 100, such as a secure digital (SD) memory card.

The communication interfaces 505, 905 may include any operable connection. An operable connection may be one in which signals, physical communications, and/or logical communications may be sent and/or received. An operable connection may include a physical interface, an electrical interface, and/or a data interface. The communication interfaces 505, 905 provides for wireless and/or wired communications in any now known or later developed format.

The user input device 903 includes one or more buttons, keypad, keyboard, mouse, stylist pen, trackball, rocker switch, touch pad, voice recognition circuit, or other device or component for inputting data to the user device 100. The user input device 903 and the display 911 may be combined as a touch screen, which may be capacitive or resistive. The display 911 may be a liquid crystal display (LCD) panel, light emitting diode (LED) screen, thin film transistor screen, or another type of display.

In an alternative embodiment, the user device 100 may omit the position circuitry 907 or prevent use of the position circuitry 907. In this alternative embodiment, the user device 100 may be a personal computer, which encompasses laptops and other mobile processing platforms.

Figure 10:
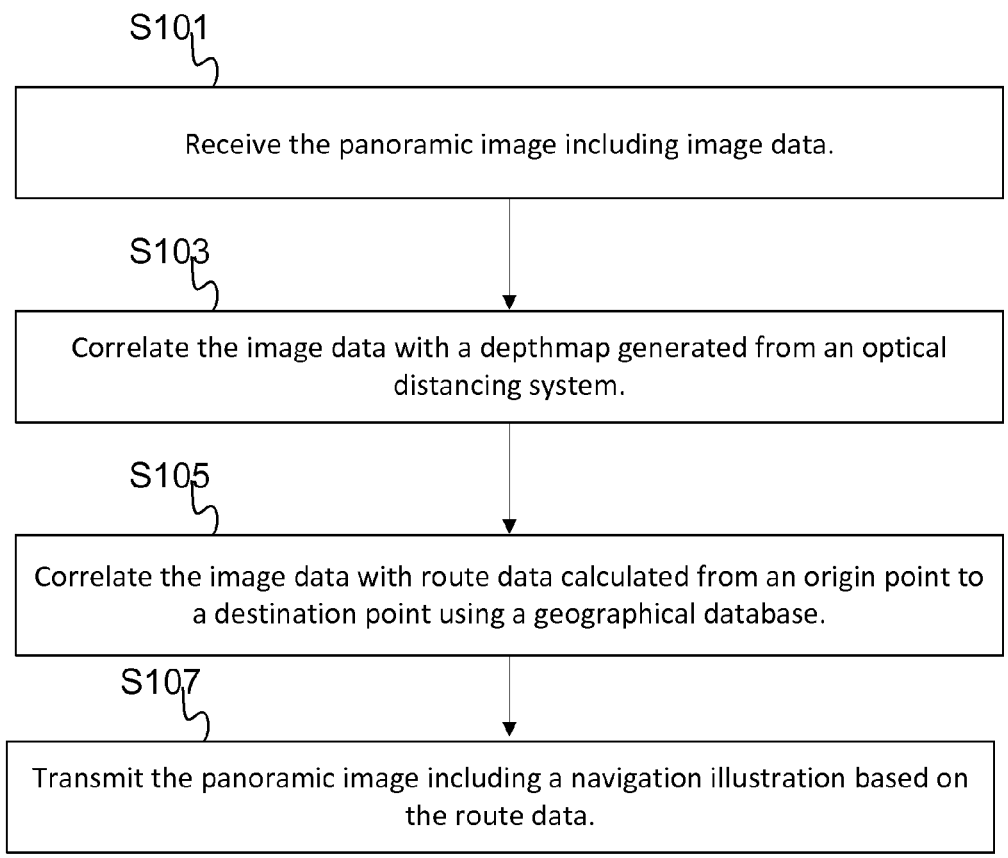
FIG. 10 illustrates a flowchart for providing three dimensional routing in an image.

FIG. 10 illustrates a flowchart for an algorithm for three dimensional routing in an image, which may include providing a depth feedback or a visual cue within the image. Fewer, more, or different steps or acts may be provided, and a combination of steps may be provided. Also, the steps or acts may be performed in the order as shown or in a different order. The method is implemented by the system and/or devices described herein or by different devices or systems. Furthermore, other methods, such as a method of calculating a route (or data thereof) or routing to a destination, may be provided based on the disclosure herein.

At S101, the controller receives or selects a panoramic image including image data. The panoramic image may be derived from a photograph. The panoramic image may be derived from an image bubble selected based on a geographic location. The geographic location may be the detected location of the user device 100 or the geographic location may be determined by inputting a location into a mapping application. The panoramic image may be a projection of a portion of the image bubble on a two dimensional plane based on the geographic location and at least one angle. The at least one angle may include a heading and/or a vertical angle.

At S103, the controller correlates the image data with a depthmap previously generated from the optical distancing system 350 and stored in memory 501 or memory 901. The depthmap was generated from collected optical distance data in the physical world and describes distances to objects in the physical world from the optical distancing system 350 and the time of collection. The distances may be measured by time of flight (laser, infrared), structured light, or a stereoscopic camera.

At S105, the controller correlates the image data of the panoramic image with route data calculated from an origin point to a destination point. The routing algorithm defines the route data in a three dimensional space. After S103, which correlates the image data with a depth map, each point in the image data is associated with the same three dimensional space. Accordingly, any portion of the route from the origin point to the destination point that falls within the panoramic image can be determined by the controller.

At S107, the controller transmits the panoramic image including a navigation illustration based on the route data to a memory, such as the memory 501 and/or the memory 901. The panoramic image including the navigation illustration may also be transmitted to a display 911 or an external device. The controller compares depth values associated with the image data with the three dimensional coordinates of the route data. If the comparison indicates the route data is closer to the foreground of the image, the controller inserts at least one pixel of a navigation illustration into the image data. If the comparison indicates the depth values associated with other objects in the panoramic image are closer to the foreground of the image, the controller leaves the image data unchanged. Alternatively, the controller may modify the image data to show a dashed line across the objects when the route is behind the objects. The controller may select a navigation illustration from a library of navigation illustrations stored in memory 501 or memory 901. The library of navigation illustrations may be indexed by geographic coordinates, other location information, navigation attributes, or another logical organization.

The controller may repeat S107 to simulate movement of the navigation illustration. For example, the controller may redraw the navigation illustration at a second point along the route defined by the route data. The second point may be a predetermined number of pixels from the first point along the route data.

The controller may repeat S107 to change the navigation illustration along the route. The navigation illustration may be determined by the destination point of the route. The navigation illustration may be specified by the user such as an icon selected by the user input device 903. The navigation illustration may be specified by collected characteristics of the user such as browser history or navigation history. In one alternative, the navigation illustration may be determined based on a particular link or segment.

In another alternative, the depth map information may be used by the routing algorithm. For example, the path of the 3D route may be a function of the depth values. For example, the spatial coordinate system used to calculate the 3D route may not include some objects that were detected by the optical distancing system 350 and included in the depth map. The server 120 or user device 100 may identify a potential collision between the 3D route and the depth values from the depthmap. In this case, the routing algorithm may be configured to select an alternate route based on potential collision with local obstacles that not stored in the map database.

In another alternative, the server 120 or user device 100 may determine from the depth map values whether there is line of sight between the user device 100 and an object in the image (e.g., an entrance to a building). Text or voice based turn-by-turn instructions may be altered based on the existence of line of sight (e.g., indicate to the user that their destination is visible from their current location). The instructions may also indicate whether the person should be in an open area (not near any depth obstructions), or passing nearby objects (depth of path passes close to depth in image depthmap).

The embodiments described above may be combined with systems and method for emphasizing objects in images as described in copending application "REIMAGING BASED ON DEPTHMAP INFORMATION" by James D. Lynch, filed Oct. 21, 2011 (Ser. No. 13/278,499), which is incorporated by reference in its entirety. The embodiments described above may also be combined with the systems and method for illustrating depth in a panoramic image or other images as described in copending application "DEPTH CURSOR AND DEPTH MEASUREMENT IN IMAGES" By James D. Lynch, filed Oct. 21, 2011 (Ser. No. 13/278,512), which in incorporated by reference in its entirety.

The embodiments described above may be implemented using computer executable instructions stored in the memory 501 and/or the memory 901, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML), graphics languages such as WebGL and OpenGL, and shading languages such as OpenGL Shading Language (GLSL) and High Level Shading Language (HLSL), and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

I claim:

1. A method comprising:
   receiving, from a memory, image data selected based on a viewer perspective;
   correlating the image data with a depthmap generated from an optical distancing system;
   correlating the image data with pedestrian route data calculated for a pedestrian route from an origin point to a destination point using a geographical database;
   comparing, with a controller, a first distance from the viewer perspective to a point correlated with the pedestrian route data to a second distance derived from the depth map at the point;
   if the comparison indicates that the first distance is closer to the viewer perspective than the second distance, then inserting at least one pixel of a navigation illustration into the image data along the pedestrian route; and
   repeating comparing the first distance and the second distance inserting at least one pixel of the navigation illustration into the image data at a plurality of subsequent pixel locations to draw a navigation icon.

2. The method of claim 1, wherein the pedestrian route data includes at least one segment designated as a pedestrian path.

3. The method of claim 1, wherein the navigation illustration comprises an indication of direction.

4. The method of claim 1,
   wherein the navigation icon is redrawn to simulate movement along a route defined by the pedestrian route data from the origin point to the destination point.

5. The method of claim 1, further comprising:
   selecting the navigation illustration from a library of navigation illustrations stored in the memory based on the origin point or the destination point.

6. The method of claim 1, further comprising:
   identifying the origin point based on a location of a mobile device including the controller.

7. The method of claim 1, further comprising:
   if the comparison indicates that the first distance is farther from the viewer perspective than the second distance, then inserting at least one pixel of a line representing the route data without removing any image data.

8. The method of claim 1, further comprising:
   selecting the pedestrian route data according to at least one pedestrian accessibility mode.

9. The method of claim 1, wherein the optical distancing system is a light detection and ranging (LIDAR) system.

10. The method of claim 1, wherein the optical distancing system emits structured infrared light.

11. An apparatus comprising:
    a memory configured to store three dimensional geographic data correlated with pedestrian route data calculated from an origin point to a destination point; and
    a controller configured to select an image correlated with a depth map and compare depth values for multiple pixel locations to a distance from a viewer perspective to the route data, wherein the controller is configured to insert a navigation illustration in the image at pixel locations where the depth values indicate that the pedestrian route data is closer than objects associated with the depth values.

12. The apparatus of claim 11, wherein the navigation illustration comprises an icon.

13. The apparatus of claim 11, wherein the navigation illustration comprises an indication of direction from the origin point to the destination point.

14. The apparatus of claim 11, further comprising:
    position circuitry configured to generate the origin point based on a location of the apparatus.

15. The apparatus of claim 11, wherein the pedestrian route data is selected according to a pedestrian mode.

16. The apparatus of claim 11, wherein the optical distancing system is a light detection and ranging (LIDAR) system or a system that emits structured infrared light.

17. A non-transitory computer readable medium having stored thereon a computer program configured to provide three dimensional routing in a panoramic image, the program comprising instructions to:
    receive the panoramic image including image data from a memory;
    correlate, with a controller, the image data with a depthmap generated from an optical distancing system;
    correlate, with the controller, the image data with pedestrian route data calculated from an origin point to a destination point using a geographical database;
    transmit the panoramic image including a navigation illustration based on the pedestrian route data;
    compare, with the controller, a first distance to a second distance, wherein the first distance is from a viewer perspective to a point correlated with the pedestrian route data, and the second distance is derived from the depth map at the point;
    if the comparison indicates the route data is closer to the viewer perspective, then inserting a navigation icon into the image data; and
    if the comparison indicates an object in the panoramic image is closer to the viewer perspective, then inserting a dotted line into the image data.

18. The non-transitory computer readable medium of claim 17, wherein the pedestrian route data is selected according to a pedestrian mode.

19. The non-transitory computer readable medium of claim 17, wherein the optical distancing system is a light detection and ranging (LIDAR) system or a system that emits structured infrared light.

20. The method of claim 1, wherein the navigation illustration is defined by a scale factor proportional to the second distance derived from the depth map.

* * * * *